United States Patent
Drueppel et al.

(10) Patent No.: US 11,254,256 B2
(45) Date of Patent: Feb. 22, 2022

(54) METHOD FOR DETECTING MISADJUSTMENTS OF THE CUT-OFF LINE OF A HEADLAMP

(71) Applicant: Hella GmbH & Co. KGaA, Lippstadt (DE)

(72) Inventors: Mathias Drueppel, Lippstadt (DE); David Duhme, Lippetal (DE); Kai Ehlert, Bueren (DE); Bernd Fischer, Altenbeken (DE); Julien Hansen, Paderborn (DE); Marc Kaup, Paderborn (DE); Lukas Poertner, Bielefeld (DE); Claas Tebruegge, Lippstadt (DE); Benjamin Willeke, Lippstadt (DE); Jan-Henning Willrodt, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 236 days.

(21) Appl. No.: 16/220,658

(22) Filed: Dec. 14, 2018

(65) Prior Publication Data

US 2019/0184889 A1 Jun. 20, 2019

(30) Foreign Application Priority Data

Dec. 14, 2017 (DE) ...................... 10 2017 129 946.7

(51) Int. Cl.
*B60Q 1/08* (2006.01)
*B60Q 1/00* (2006.01)

(52) U.S. Cl.
CPC .......... *B60Q 1/085* (2013.01); *B60Q 1/0023* (2013.01); *B60Q 2300/42* (2013.01)

(58) Field of Classification Search
CPC .. B60Q 1/085; B60Q 1/0023; B60Q 2300/42; B60Q 1/115
See application file for complete search history.

(56) References Cited

U.S. PATENT DOCUMENTS

| | | | | |
|---|---|---|---|---|
| 5,182,502 A | * | 1/1993 | Slotkowski | B60Q 1/1423 315/159 |
| 5,347,261 A | * | 9/1994 | Adell | B60Q 1/38 307/10.8 |
| 5,537,003 A | * | 7/1996 | Bechtel | B60Q 1/1423 315/82 |
| 6,144,159 A | | 11/2000 | Lopez et al. | |

(Continued)

FOREIGN PATENT DOCUMENTS

| | | |
|---|---|---|
| DE | 19704427 A1 | 8/1998 |
| DE | 102004027532 A1 | 12/2005 |

(Continued)

*Primary Examiner* — Sze-Hon Kong
(74) *Attorney, Agent, or Firm* — Muncy, Geissler, Olds & Lowe, P.C.

(57) ABSTRACT

A method for detecting misadjustments of a headlamp of a vehicle and to a device for this purpose. It is provided that the vehicle is provided with a detector with which at least one light signal of another road user is detected, and wherein the vehicle is equipped with a control unit with which light signal information of the detector is captured and by means of which adjustment information for correcting the misadjustment of the headlamp is output as a function of the captured light signal information.

12 Claims, 1 Drawing Sheet

(56) References Cited

U.S. PATENT DOCUMENTS

| | | | | |
|---|---|---|---|---|
| 6,275,145 B1* | 8/2001 | Rogozinski | B60Q 1/0023 | 340/425.5 |
| 6,429,594 B1* | 8/2002 | Stam | B60Q 1/18 | 315/82 |
| 6,861,809 B2* | 3/2005 | Stam | F21S 41/321 | 315/82 |
| 7,365,769 B1* | 4/2008 | Mager | B60Q 1/44 | 340/467 |
| 7,653,215 B2* | 1/2010 | Stam | B60Q 1/085 | 382/104 |
| 7,930,083 B2 | 4/2011 | Eberhardt et al. | | |
| 8,738,236 B2* | 5/2014 | Moizard | B60Q 1/12 | 701/49 |
| 9,436,880 B2* | 9/2016 | Bos | H04N 13/239 | |
| 9,789,809 B2* | 10/2017 | Foltin | B60Q 1/08 | |
| 2002/0135468 A1* | 9/2002 | Bos | B60Q 1/143 | 340/436 |
| 2004/0143380 A1* | 7/2004 | Stam | H05B 47/17 | 701/36 |
| 2005/0094410 A1* | 5/2005 | Stephan | G01S 17/18 | 362/510 |
| 2005/0168151 A1* | 8/2005 | Shaffer | G02B 23/12 | 315/82 |
| 2006/0125616 A1* | 6/2006 | Song | B60Q 1/38 | 340/463 |
| 2006/0192665 A1* | 8/2006 | Song | B60Q 1/44 | 340/469 |
| 2007/0008093 A1* | 1/2007 | Nigro | B60Q 1/50 | 340/436 |
| 2009/0043458 A1* | 2/2009 | Kamioka | B60Q 1/085 | 701/49 |
| 2009/0045323 A1* | 2/2009 | Lu | G06T 7/80 | 250/208.1 |
| 2009/0072124 A1* | 3/2009 | Schofield | B60Q 1/143 | 250/208.1 |
| 2009/0086496 A1* | 4/2009 | Todani | B60Q 1/10 | 362/465 |
| 2009/0279317 A1* | 11/2009 | Tatara | B60Q 1/12 | 362/465 |
| 2011/0210665 A1* | 9/2011 | Asquith | B60Q 1/46 | 315/82 |
| 2011/0295471 A1* | 12/2011 | Schmidt | B60Q 1/12 | 701/49 |
| 2012/0044066 A1* | 2/2012 | Mauderer | G08G 1/161 | 340/479 |
| 2012/0203427 A1* | 8/2012 | Ehlgen | B60Q 1/143 | 701/36 |
| 2012/0206043 A1* | 8/2012 | Yamazaki | B60Q 1/143 | 315/82 |
| 2012/0275172 A1* | 11/2012 | Mizuno | B60Q 1/085 | 362/464 |
| 2013/0049587 A1* | 2/2013 | Nakadate | B60Q 1/08 | 315/82 |
| 2013/0049588 A1* | 2/2013 | Foltin | B60Q 1/115 | 315/82 |
| 2014/0029792 A1* | 1/2014 | Kato | B60Q 1/143 | 382/103 |
| 2014/0169010 A1* | 6/2014 | Imaeda | B60Q 1/02 | 362/460 |
| 2015/0003087 A1* | 1/2015 | Futamura | B60Q 9/008 | 362/466 |
| 2015/0051797 A1* | 2/2015 | Ehlgen | G06K 9/00825 | 701/49 |
| 2015/0088385 A1* | 3/2015 | Fleury | B60J 3/04 | 701/48 |
| 2015/0149045 A1* | 5/2015 | Mizuno | B60Q 1/1423 | 701/49 |
| 2016/0167566 A1* | 6/2016 | Tanaka | F21S 41/151 | 315/82 |
| 2016/0318437 A1* | 11/2016 | Vilakathara | B60Q 1/143 | |
| 2016/0355179 A1* | 12/2016 | Cannella | B60Q 9/008 | |
| 2016/0375827 A1* | 12/2016 | Bonhoure | B60R 1/00 | 340/937 |
| 2017/0028903 A1* | 2/2017 | Mochizuki | F21S 41/143 | |
| 2017/0225609 A1* | 8/2017 | Tsuzuki | B60Q 1/115 | |
| 2017/0253172 A1* | 9/2017 | Canonne | B60Q 1/0023 | |
| 2018/0096668 A1* | 4/2018 | Surnilla | B60R 1/00 | |
| 2018/0132340 A1* | 5/2018 | Correa | B60Q 1/085 | |
| 2019/0031085 A1* | 1/2019 | Ba | G06K 9/00604 | |
| 2019/0093845 A1* | 3/2019 | Miyairi | F21S 41/265 | |
| 2019/0118698 A1* | 4/2019 | Nakashima | F21S 41/125 | |
| 2019/0128497 A1* | 5/2019 | Tessnow | H05B 45/48 | |
| 2019/0359121 A1* | 11/2019 | Shimada | B60Q 1/1415 | |
| 2020/0198525 A1* | 6/2020 | Mueller | H05B 45/10 | |

FOREIGN PATENT DOCUMENTS

| | | |
|---|---|---|
| DE | 102006016071 A1 | 10/2007 |
| DE | 102012024148 A1 | 6/2014 |

* cited by examiner

METHOD FOR DETECTING MISADJUSTMENTS OF THE CUT-OFF LINE OF A HEADLAMP

This nonprovisional application claims priority under 35 U.S.C. § 119(a) to German Patent Application No. 102017129946.7, which was filed in Germany on Dec. 14, 2017, and which is herein incorporated by reference.

BACKGROUND OF THE INVENTION

Field of the Invention

The present invention relates to a method for detecting misadjustments of a headlamp of a vehicle, as well as to a device for this purpose.

Description of the Background Art

For example, a method for detecting misadjustments of a headlamp of a vehicle is known from DE 10 2006 016 071 A1, which corresponds to U.S. Pat. No. 7,930,083, and which is associated with a headlight range adjusting device to track the beam range of the headlamp. At least two image acquisition units are provided for this purpose, the images of which are forwarded to a control unit for evaluation, wherein based on the images of the at least two image acquisition units, a road course is generated as a three-dimensional image so that based on the determined road course, anticipatory adjustment of the beam range of the headlamp can be performed. Thus, a feedback device for detecting the actual beam range of the headlamp is not possible.

DE 197 04 427 A1, which corresponds to U.S. Pat. No. 6,144,159, discloses a method for detecting misadjustments of a headlamp of a vehicle, and two transmitting devices are provided, by means of which in each case a radiation beam is emitted, each of which illuminate a spot on the road at a distance in front of the vehicle, wherein the two spots are spaced apart at a distance from each other. The spots are shown as pixels with a detector, wherein the pixels are spaced apart at a distance. If the beam range of the headlights is set correctly, the distance between the two spots is mapped as a defined distance in a control unit, and a misadjustment of the beam range results in a different spacing between the pixels, which can be evaluated. The evaluation provides an adjustment value that is transmitted to the headlight range adjusting device of the headlamp in order to correct the beam range. However, this process is laborious and not reliable in every traffic situation. Particularly if the light beam generated by the transmitting device is in the visible spectral range, this is always seen as negative by a vehicle occupant when operating the headlamp, and is irritating.

Incorrectly adjusted headlamps of a vehicle are not always noticed by the driver. However, an incorrectly adjusted beam range of a headlamp can cause glare for other road users, in particular if the so-called light-dark cut-off line is set too high.

Ordinary headlight range adjusting devices are just controls that track the beam range, for example, as a function of an axle load. In this case, the basic setting of the headlamp plays an essential role, and if the entire reference system is misadjusted with respect to the beam range, then the headlight range adjusting device only adjusts the angles within the reference system, but does not take on the overall error of the reference system. As a result, even a headlamp with a headlight range adjusting device can produce glare for other road users.

SUMMARY OF THE INVENTION

It is therefore an object of the present invention to provide a simple method for detecting misadjustments of a headlamp of a vehicle as well as to provide a device for this purpose, which effectively monitors misadjustments of a headlamp and is of simple design. In particular, the transmission of additional pixels shall be avoided, which additionally have other wavelength ranges, because then the cost to design the headlamp and an associated headlight range adjusting device considerably increases.

In an exemplary embodiment, the invention includes the technical teaching that the vehicle is designed with a detector, with which at least one light signal of another road user is detected, and wherein the vehicle is equipped with a control unit, with which light signal information of the detector is picked up and by means of which adjustment information for correcting the misadjustment of the headlamp is output as a function of the captured light signal information.

The core idea of the invention is the use of a detector usually already existing in a vehicle, such as a camera or a camera for capturing the area in front of the vehicle in order to detect light signals of the other road users, or other vehicle sensors. If another road user is blinded, the latter can, for example, emit a signal with his primary headlamp or with his rear fog lamp of this other vehicle that is detected by the detector. For example, the oncoming traffic can turn up their headlamps once or repeatedly, a so-called flashing of the headlamps, to draw the vehicle driver's attention to their incorrectly adjusted headlamps. Usually it is the light-dark cut-off line of the low beam that is set too high. It is also possible to blind a preceding road user, who can signal this with a single or multiple short flashing of his rear fog light, the light signal of which is then also detected by the detector, for example, by means of the camera in the front of one's own vehicle. The detector transmits light signal information to the control unit, which evaluates said information using a corresponding algorithm, and, based on the at least one light signal information, can emit adjustment information for correcting the misadjustment of the headlamp.

Particularly advantageously, the headlamp is designed to include a headlight range adjusting device, and the adjustment information can be output to the headlight range adjusting device, which performs a headlamp range adjustment in the headlamp as a function of the adjustment information. The vehicle driver can optionally be made aware of this adjustment.

In particular, it may be provided that the adjustment information is sent to a display instrument of the vehicle, for example, to the instrument cluster in the interior of the vehicle, either solely or additionally in order to act on the headlight range adjusting device. This way, the misadjustment of the headlamp and/or the need to correct the misadjustment of the headlamp can be displayed to the driver of the vehicle.

The adjustment information can be output to a storage of the vehicle, so that the need for correcting the misadjustment of the headlamp can be read out of the storage at a later time. The reading at a later date, for example, can be done as part of a vehicle service at an auto repair shop, wherein it is also conceivable that the display instrument informs the vehicle driver of the service need. The storage can be any type of electronic device that can be used to store data, for example, internal and external hard drives, CDs, DVDs, USB drives, ZIP disks, SD cards, etc.

The adjustment information can be output by the control unit only when a plurality of light signal information, so for example at least two pieces of light signal information, have been transmitted from the detector to the control unit. In this case, the plurality of light signal information detected by the detector should be detected by the various other road users before the control unit outputs adjustment information. The fact that light signals of several road users have been detected can be recognized in that there is a time interval between two light signals, wherein the detector can also be configured to be in operative connection with the control unit in such a way that it can be recognized that light signals are output by different road users.

The invention further relates to a device in a vehicle for detecting misadjustments of a headlamp of the vehicle, and in accordance with the invention, it is provided that the device comprises a detector, with which at least one light signal of another road user can be detected, and wherein the device has a control unit with which light signal information of the detector can be picked up and with which adjustment information for correcting the misadjustment of the headlamp can be output as a function of the captured light signal information.

In particular, the headlamp of the vehicle has a headlight range adjusting device, wherein the control unit is in operative connection with the headlight range adjusting device and wherein the adjustment information can be output to the headlight range adjusting device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
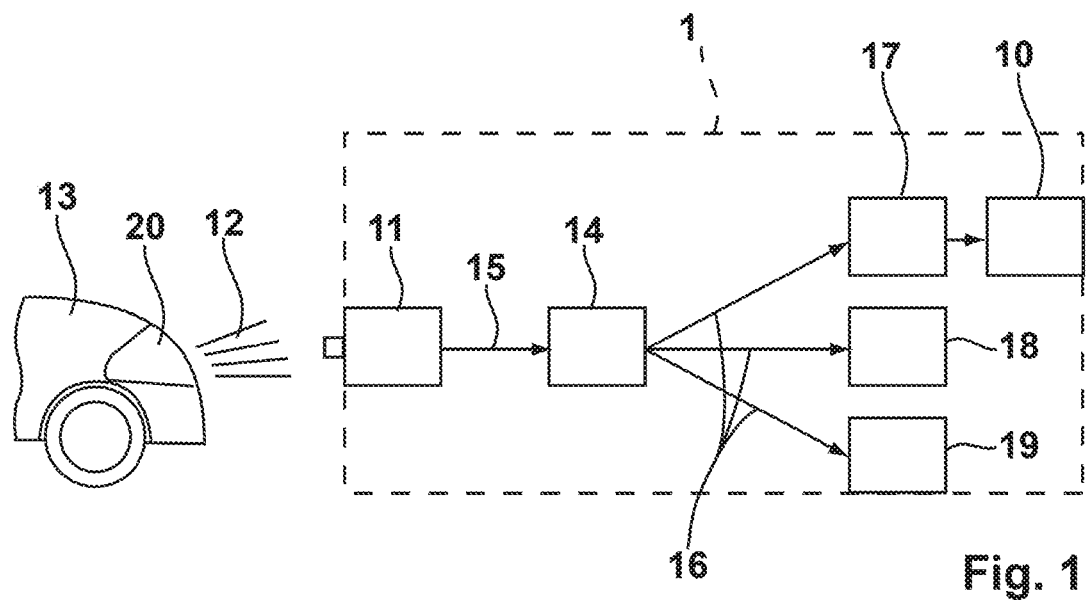
FIG. 1 is a schematic view of a device for detecting misadjustments of a headlamp of the vehicle.

FIG. 1 shows a schematic view of a vehicle 1 with a headlamp 10, and the headlamp 10 is in communication with a headlight range adjusting device 17. Another road user 13 is generating a light signal 12 with a primary headlamp 20.

The device for carrying out the method according to the invention comprises a detector 11, for example a camera, which is arranged in the windshield of the vehicle 1. The detector 11 provides light signal information 15, which is triggered by the light signal 12. In this case, the detector 11 is in communication with a control unit 14, and the light signal information 15 is transmitted to the control unit 14 from the detector 11.

The control unit 14 serves to execute a correspondingly programmed algorithm with which conclusions can be drawn about whether and when adjustment information 16 can be output from the control unit 14. The algorithm can be programmed in such a way that, for example, adjustment information 16 is output upon receipt of at least two pieces, of at least three pieces or of a plurality of light signal information 15.

The adjustment information 16 can be sent from the control unit 14 to various other devices. Preferably, the adjustment information 16 is output to the headlight range adjusting device 17 of the headlamp 10. In this case, the adjustment information 16 can, for example, be set to be so small that an incorrectly adjusted cut-off line is adjusted downwards by only a very small adjustment value. If, in addition, the control unit 14 detects light signal information 15 from the detector 11, further adjustment information 16 can be issued to the headlight range adjusting device 17 until the control unit 14 detects no further light signal information 15 from the detector 11.

Additionally or alternatively, it is conceivable that the adjustment information 16 is output to a display instrument 18 or a storage 19. If the adjustment information 16 is output to a display instrument 18, then the latter can, for example, constitute the instrument cluster in the interior of the vehicle 1 so that the driver of the vehicle 1 is informed about the detected light signals 12. It is also possible that a storage 19 stores the adjustment information 16 received from the control unit 14, and the storage 19 may, for example, be read out in the context of a repair service in an auto repair shop. In this case, the storage 19 can also be integrally molded with the control unit 14.

Figure 2:
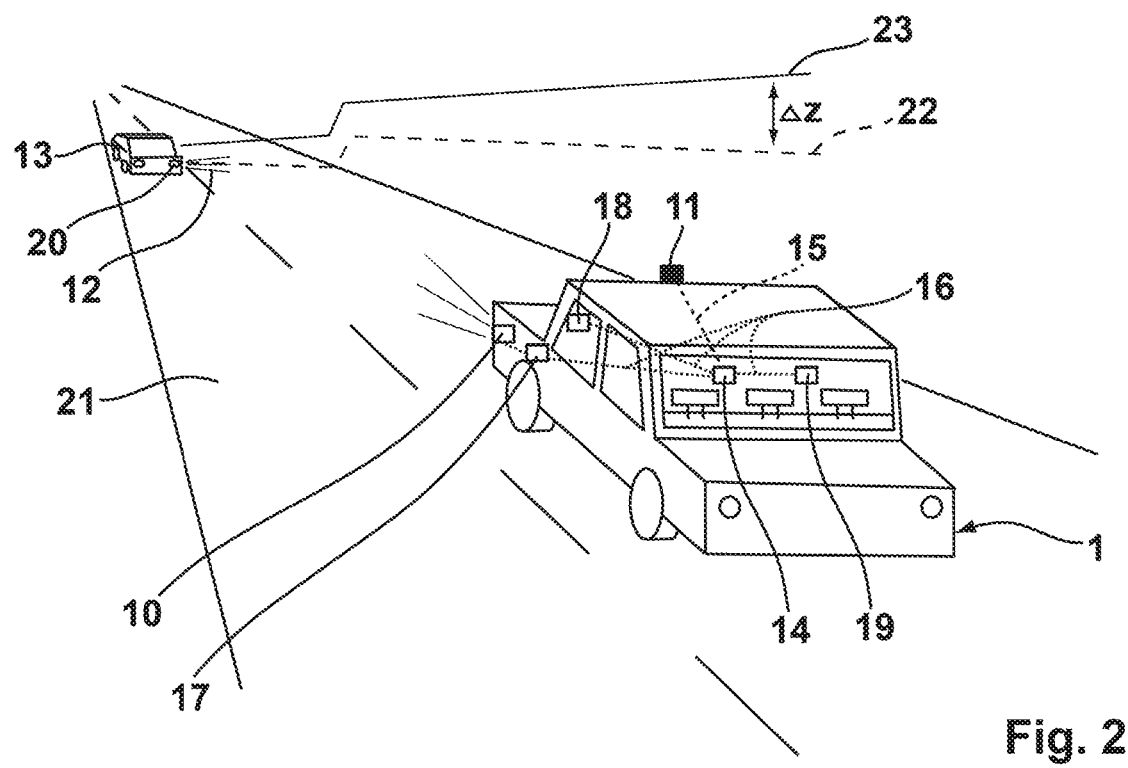
FIG. 2 is a possible traffic situation with the vehicle in conjunction with another road user which activates the method according to the invention.

FIG. 2 shows a traffic situation with the vehicle 1 and another road user 13, who represents oncoming traffic on a road 21. By way of example, the vehicle 1 is shown with an excessively high, incorrect cut-off line 23, and the required cut-off line 22 has a target-actual deviation $\Delta z$.

The vehicle 1 is schematically designed with the detector 11, with the control unit 14, as well as with the headlight range adjusting device 17, the display instrument 18 and the storage 19. Here, the headlight range adjusting device 17 cooperates with the headlamp 10 of the vehicle 1.

If the other road user 13 produces the light signal 12, for example, with his primary headlamp 20, this is detected by the detector 11 and the detector 11 outputs the light signal information 15 to the control unit 14. After a corresponding algorithm in the control unit 14 has run, adjustment information 16 is generated which is output to either the headlight range adjusting device 17, to the display instrument 18 or to the storage 19. It is also possible to output the adjustment information 16 to more than one of the devices 17, 18 or 19. For example, the adjustment information 16 may be sent to the headlight range adjusting device 17 and at the same time, this output is also transmitted to the display instrument 18 so that the driver of the vehicle 1 is informed about the headlight range adjusting device 17 being activated as a result of the adjustment information 16. Similarly, the storage 19 can also store the adjustment information 16 accordingly so that this can be read out at a later date.

The execution of the invention is not limited to the above preferred embodiment. Rather, a number of variants are conceivable which make use of the illustrated solution even with fundamentally different embodiments. All features and/or advantages resulting from the claims, the description or the drawings, including constructive details or spatial arrangements and method steps, may be essential to the invention in their own right as well as in a variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for detecting misadjustments of a headlamp of a vehicle, the method comprising:
    providing the vehicle with a detector;
    detecting at least one light signal of another road user via the detector, the at least one light signal including a repeated flashing of headlamps or rear lights associated with the another road user;
    providing light signal information from the at least one light signal detected by the detector to a control unit provided in the vehicle, the light signal information being derived from the at least one light signal from the another road user indicating a misadjustment of a range of the headlamp; and
    outputting by the control unit, adjustment information for correcting the misadjustment of the headlamp as a function of the captured light signal information,
    wherein the control unit outputs the adjustment information to a display instrument so that the driver is informed of the adjustment, to a headlight range adjusting device of the headlamp, and to storage in the vehicle as a need for adjustment.

2. The method according to claim 1, wherein the adjustment information is output to the headlight range adjusting device to perform a beam range adjustment in the headlamp as a function of the adjustment information.

3. The method according to claim 1, wherein the adjustment information is output to the display instrument of the vehicle so that the misadjustment of the headlamp and/or a need to correct the misadjusted headlamp is displayed to a driver of the vehicle.

4. The method according to claim 1, wherein the adjustment information is output to the storage of the vehicle so that the need to correct the misadjusted headlamp is read out from the storage at a later time.

5. The method according to claim 1, wherein the adjustment information is not output by the control unit until a plurality of light signal information has been transmitted from the detector to the control unit.

6. The method according to claim 5, wherein the plurality of light signal information captured by the detector is detected from various additional road users.

7. The method according to claim 1, wherein the light signal of the another road user is output by a primary headlamp or by a rear fog lamp of another vehicle of the another road user.

8. The method according to claim 1, further comprising:
    detecting a second light signal of the at least one light signal of a further road user via the detector;
    providing additional light signal information from the second light signal to the control unit, the light signal information being derived from the second light signal of the further road user and indicating an additional correction is needed; and
    outputting by the control unit, further adjustment information for correcting the misadjustment of the headlamp based on the additional light signal information.

9. The method according to claim 1, wherein the adjustment information is output to a headlight range adjusting device that adjusts a cut-off line of a headlight of the vehicle.

10. A device in a vehicle for detecting misadjustments of a headlamp of the vehicle, the device comprising:
    a detector with which at least one light signal from another road user is detected, the at least one light signal including a repeated flashing of headlamps or rear lights associated with the another road user that indicates a misadjustment of the headlamp; and
    a control unit that receives light signal information from the detector, the light signal information being derived from the at least one light signal of the another road user indicating the misadjustment of a range of the headlamp and the control unit generating adjustment information for correcting the misadjustment of the headlamp as a function of the captured light signal information,
    wherein the control unit outputs the adjustment information to a display instrument so that the drive is informed of the adjustment, to a headlight range adjusting device of the headlamp, and to storage in the vehicle as a need for adjustment.

11. The device according to claim 10, wherein the control unit is in operative connection with the headlight range adjusting device, and wherein the adjustment information is output to the headlight range adjusting device.

12. The device according to claim 10, wherein the adjustment information is output to a headlight range adjusting device that adjusts a cut-off line of a headlight of the vehicle.

* * * * *